United States Patent
Kopietz et al.

(10) Patent No.: US 7,514,062 B2
(45) Date of Patent: Apr. 7, 2009

(54) PROCESS FOR THE PRODUCTION OF FURNACE BLACK

(75) Inventors: Peter Kopietz, Grassau (DE); Volker Heinze, Hagen (DE); Johann Mathias, Kahl (DE)

(73) Assignee: Degussa AG, Düsseldorf (DE)

( * ) Notice: Subject to any disclaimer, the term of this patent is extended or adjusted under 35 U.S.C. 154(b) by 630 days.

(21) Appl. No.: 10/831,472

(22) Filed: Apr. 23, 2004

(65) Prior Publication Data
US 2004/0213728 A1 Oct. 28, 2004

(30) Foreign Application Priority Data
Apr. 24, 2003 (DE) ................. 103 18 527

(51) Int. Cl.
C01D 3/00 (2006.01)
(52) U.S. Cl. ................. 423/449.8; 423/449.1
(58) Field of Classification Search ................. 423/450, 423/449.1, 449.2, 449.3, 449.4, 449.5, 449.6, 423/449.7, 449.8
See application file for complete search history.

(56) References Cited

U.S. PATENT DOCUMENTS

| | | | | |
|---|---|---|---|---|
| 3,253,890 A | * | 5/1966 | De Land et al. ............. | 423/455 |
| 3,674,437 A | * | 7/1972 | Austin et al. ................. | 425/422 |
| 4,755,371 A | * | 7/1988 | Dickerson .................... | 423/450 |
| 4,904,454 A | * | 2/1990 | Schaefer et al. ............. | 422/151 |
| 4,976,945 A | * | 12/1990 | Kanamaru et al. ........... | 423/450 |
| 6,348,181 B1 | * | 2/2002 | Morgan .................... | 423/449.1 |
| 6,391,274 B1 | * | 5/2002 | Vogler et al. ................. | 423/275 |
| 2001/0055556 A1 | * | 12/2001 | Iida et al. .................... | 423/456 |

FOREIGN PATENT DOCUMENTS

| | | |
|---|---|---|
| DE | 195 21 565 A1 | 1/1997 |
| DE | 196 13 796 A1 | 10/1997 |
| WO | WO 98/42778 | 10/1998 |
| WO | WO 98/45361 | 10/1998 |

* cited by examiner

Primary Examiner—Edward M. Johnson
Assistant Examiner—Daniel C. McCracken
(74) Attorney, Agent, or Firm—Robert G. Wellacher; Smith, Gambrell & Russell, LLP

(57) ABSTRACT

Process for the production of furnace black by producing a stream of hot combustion gases in a combustion chamber, feeding the hot combustion gases along a flow axis from the combustion chamber through a reactor narrow point into a reaction zone, mixing carbon black raw material into the flow of the combustion gases in front of, inside or behind the reactor narrow point and stopping carbon black formation downstream in the reaction zone by spraying in water, steam being jetted in axially through the gas burner and optionally at the radial oil nozzles and beaded carbon black being introduced before and/or after the reactor narrow point.

7 Claims, 1 Drawing Sheet

PROCESS FOR THE PRODUCTION OF FURNACE BLACK

INTRODUCTION AND BACKGROUND

The present invention relates to a process for the production of furnace black.

Furnace blacks are produced in large quantities in carbon black reactors for a wide variety of industrial applications. Carbon black reactors generally consist of combustion chambers, mixing chambers and reaction chambers arranged along the axis of the reactor, which are connected with each other and form a flow path for the reaction media from the combustion chamber through the mixing chamber to the reaction chamber. In the combustion chamber a fuel, normally gas or oil, is burned with the aid of a burner with the addition of pre-heated combustion air, to produce a high temperature. A mostly liquid, carbon-containing raw material, for example a black oil, is sprayed into the hot combustion gases, some of the carbon black raw material being burned and the rest being converted into carbon black and tail gas by thermal cracking. Hydrocarbons with a highly aromatic composition, such as coal-tar oils, ethylene cracker residues and other petroleum products, for example, are used as carbon black raw materials.

The carbon black raw material is normally sprayed or injected into a mixing chamber formed as a narrow point to achieve intensive mixing of the carbon black raw material with the hot combustion gases as a result of the great turbulence of combustion gases prevailing there. This mixture then enters the carbon black reaction chamber, which normally has a broader cross-section than the narrow point. The actual carbon black formation process, consisting of nucleation followed by growth of the carbon black nuclei, takes place in this reaction chamber and is stopped downstream by spraying in water. All reactor components consist of a steel shell with an inner lining of ceramic material.

The physical and chemical processes that take place during carbon black formation are very complex. The heat of the combustion gases is very quickly transferred to the atomized droplets of the carbon black raw material and leads to more-or-less complete evaporation of the droplets. Some of the evaporated carbon black raw material is burned in the excess combustion air. Under these conditions, the molecules of the carbon black raw material are dehydrated and form carbon black nuclei. Nucleation is substantially restricted to a limited spatial area, the nucleation zone, inside the reaction chamber directly behind the mixing chamber. In the downstream area of the reaction chamber, the carbon black nuclei grow to form spherical or needle-like primary particles. The primary particles in turn combine under the reactive conditions in the reaction chamber to form larger aggregates, firmly bonded to each other. The way in which the particles combine is generally described as the structure of the carbon black.

The factors that substantially influence carbon black formation are the air or oxygen excess in the combustion gases, the temperature of the combustion gases and the reaction or residence time from the mixing of the carbon black raw material into the combustion gases to the stopping of the reaction by quenching with water, which is sprayed into the downstream area of the reaction chamber using a quenching nozzle.

The temperature of the combustion gases is normally set to a value of 1200 to 1900° C. The higher the temperature, the smaller the carbon black aggregates formed. The residence time also influences the aggregate size distribution. It can be adjusted in known carbon black reactors by means of the flow speed and positioning of the quenching nozzle to 1 ms to 1 s.

The stated carbon black production process is known from Ullmanns Enzyklopädie der technischen Chemie 4$^{th}$ Edition, Volume 14, pages 633 ff (1977) (in German) and from Carbon Black, Science and Technology, Verlag Marcel Dekker, Inc., New York 1993.

The known process has the disadvantage that the colour depth of the furnace blacks can only be obtained by costly post-treatment outside of the furnace reactor.

SUMMARY OF THE INVENTION

An object of the present invention is to provide a process in which deep-coloured furnace blacks can be produced directly in the furnace reactor.

The present invention provides a process for the production of furnace black by producing a stream of hot combustion gases in a combustion chamber, feeding the hot combustion gases along a flow axis from the combustion chamber through a reactor narrow point into a reaction zone, mixing the carbon black raw material into the flow of the combustion gases in front of, inside or behind the reactor narrow point and stopping carbon black formation downstream in the reaction zone by spraying in water, which is characterised in that steam is jetted in axially through the gas burner and optionally at the radial oil nozzles and beaded carbon black is introduced either before and/or after the reactor narrow point.

The combustion chamber temperature can be 1000° to 2000° C., preferably 1000° to 1700° C. The gas burner can be arranged axially. The number of radial oil nozzles at which steam can be introduced can be 1 to 8, preferably 2 to 4, most preferably 4. The steam jetted in at the radial oil nozzles can contain potassium or sodium compounds, for example salts such as potassium or sodium carbonate. The potassium or sodium compounds can be used to adjust the carbon black structure. The total quantity of steam can be 100 kg/h to 10 t/h, preferably 1 t/h to 6 t/h. The potassium or sodium quantity can be 0 to 50 kg/h, preferably 0 to 15 kg/h.

Any known carbon black, such as for example furnace black, gas black, channel black, lamp black, thermal black, acetylene black, plasma black, inversion black, known from DE 95 21 565, Si-containing blacks, known from WO 98/45361 or DE 196 13 796, or metal-containing blacks known from WO 98/42778, arc black and carbon blacks that are by-products of chemical production processes, can be used to make the beaded carbon black. Off-spec carbon black (waste black) can also be used to make beaded carbon black.

The beaded carbon black can be introduced with a support medium. Air, nitrogen, natural gas, tail gas or other gas components can be used as a support medium.

The steam at the radial oil nozzles can be jetted through atomizer or spray nozzles radially into the stream of combustion gases.

The steam that is jetted in axially through the gas burner can be mixed into the combustion gases by means of an axial lance, to the top of which the spray or injection nozzles are attached.

Both single material and dual material nozzles can be used as spray or injection nozzles and both steam and steam with potassium or sodium compounds can be used with the dual material nozzles.

The process according to the invention produces a deep-coloured pigment furnace black or a conductive black. The thermal and chemical treatment of furnace black produces a flammable gas.

BRIEF DESCRIPTION OF DRAWING

The present invention will be further understood with reference to the accompanying drawing wherein.

DETAILED DESCRIPTION OF INVENTION

Figure 1:
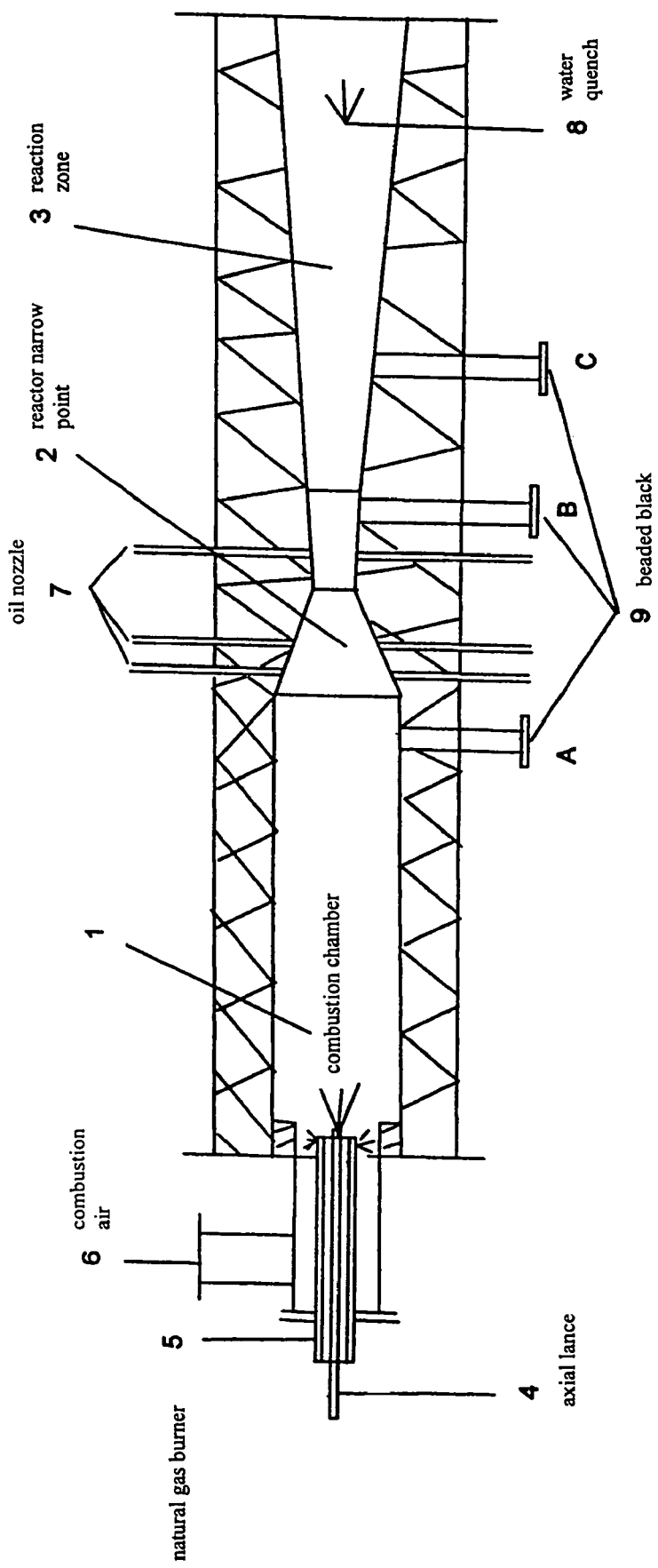
FIG. 1 is a schematic view showing the embodiment and details of the furnace reactor according to the invention.

FIG. 1 represents a longitudinal section through a furnace black reactor with an axial gas lance. It shows the combustion chamber (1), the reactor narrow point (2) and the reaction zone (3). In the natural gas burner (5) there is an axial lance (4), through which steam is jetted in. The combustion air is fed in through the axial opening (6). More steam can be fed in through the plurality of radial oil nozzles (7). The reaction in the reaction zone (3) is broken off by spraying in water through the quenching water nozzles (8). The beaded carbon black (9) is introduced with or without a support medium before (A) or after (B or C) the narrow point.

EXAMPLE

In a furnace reactor according to FIG. 1, a carbon black is produced with the reactor parameters given in Table 1.

TABLE 1

| | | |
|---|---|---|
| Combustion air | [Nm$^3$/h] | 3000 |
| Natural gas | [Nm$^3$/h] | 250 |
| Total steam quantity | [kg/h] | 3000 |
| Potassium carbonate | [kg/h] | 8 |
| Combustion chamber temperature | [° C.] | 1500-1600 |
| Black jetting-in | [kg/h] | 850 |
| Position of black jetting-in (before narrow point) | [mm] | 320 |
| Temperature after narrow point | [° C.] | 1400-1450 |
| Air injector | [Nm$^3$/h] | 200 |
| Temperature at end of reactor | [° C.] | 700 |

The carbon black obtained has the carbon black characteristics given in Table 2.

TABLE 2

| | | | |
|---|---|---|---|
| Iodine value | [mg/g] | DIN 53582 | 814 |
| BET specific surface area | [m$^2$/g] | ASTM D-4820 | 749 |
| CTAB surface area | [m$^2$/g] | ASTM D-3765 | 371 |
| DBP | [ml/100 g] | DIN 53601 | 235 |
| pH value | [—] | DIN EN ISO 787/9 | 6.2 |
| Oil demand | [g/100 g] | DIN EN ISO 787/5 | 690 |
| My value | [—] | DIN 55979 | 263 |
| Tint | [%] | DIN EN ISO 787/16 | 120 |

The carbon blacks produced by the process according to the invention have a high surface area, high colour strength (tint) and a high colour depth (My value).

Further variations and modifications of the foregoing will be apparent to those skilled in the art and are intended to be encompassed by the claims appended hereto.

German priority application 103 18 527.5 filed Apr. 24, 2003, is relied on and incorporated herein by reference.

We claim:

1. A process for the production of furnace black in a furnace black reactor having a flow axis, a gas burner, a combustion chamber, a reactor narrow point and a reaction zone, said process comprising:
  introducing fuel and combustion air into said gas burner,
    introducing steam axially into said gas burner by means of an axial lance upstream from said reactor narrow point, and jetting said steam axially through said gas burner,
  producing thereby a flow of hot combustion gases which flows into said combustion chamber of said reactor, feeding the hot combustion gases along said flow axis from the combustion chamber through a reactor narrow point into a reaction zone, mixing beaded carbon black into the flow of hot combustion gases before and/or after the reactor narrow point and stopping carbon black formation downstream in the reaction zone by spraying in water.

2. The process according to claim 1 wherein additional steam is introduced through a plurality of radial oil nozzles located in the reactor narrow point.

3. The process for the production of furnace black according to claim 2, characterised in that the plurality of radial oil nozzles at which steam is introduced is 1 to 8.

4. The process according to claim 1, wherein the hot combustion gases are produced from natural gas in the gas burner having an axial lance into which steam is jetted in.

5. The process for the production of furnace black according to claim 2, further comprising introducing potassium or sodium compounds with the steam jetted in at the radial oil nozzles.

6. The process for the production of furnace black according to claim 1, wherein the beaded carbon black is introduced with a support medium.

7. The process for the production of furnace black according to claim 6, wherein the support media is air, nitrogen, natural gas, tail gas or other gas component.

* * * * *